United States Patent [19]
Nakagawa

[11] Patent Number: 5,979,982
[45] Date of Patent: Nov. 9, 1999

[54] CHILD SEAT

[75] Inventor: Osamu Nakagawa, Shiga, Japan

[73] Assignee: Takata Corporation, Tokyo, Japan

[21] Appl. No.: 09/115,607

[22] Filed: Jul. 15, 1998

[51] Int. Cl.[6] .................................................. A47C 1/08
[52] U.S. Cl. ..................................... 297/250.1; 24/685 B
[58] Field of Search ............................... 297/250.1, 253, 297/464, 485, 479; 24/685 B

[56] References Cited

U.S. PATENT DOCUMENTS

| | | | |
|---|---|---|---|
| 3,186,762 | 6/1965 | Lucas | 297/485 |
| 5,383,708 | 1/1995 | Nagasaka et al. | 297/250.1 |
| 5,695,243 | 12/1997 | Anthony et al. | 297/250.1 |
| 5,797,654 | 8/1998 | Stroud | 297/250.1 |

*Primary Examiner*—Milton Nelson, Jr.
*Attorney, Agent, or Firm*—Kanesaka & Takeuchi

[57] ABSTRACT

A child seat capable of being easily and securely fixed to a vehicle seat. After placing the child seat on the vehicle seat and latching a tongue with a buckle, a belt is pulled by gripping a handle. Then, a lever of a tensioner is pivoted to increase the tension on the belt, thereby fixing the child seat. The tensioner includes two clamp portions. The belt is prevented from moving by the second clamp portion and the belt hung on a belt-hanging bar is pulled, thereby tightening the belt between the tensioner and the buckle.

5 Claims, 9 Drawing Sheets

CHILD SEAT

FIELD OF THE INVENTION

The present invention relates to a child seat in which an infant may be seated, more particularly to a child seat which is structured to be fixed to a vehicle seat, which is previously provided with a latch member, by latching a child-seat-fixing belt with the latch member, and tightening up the belt.

BACKGROUND OF THE INVENTION

The following structure is one of conventional structures for fixing a child seat, in which an infant may be seated, to a vehicle seat. The vehicle seat is previously provided with a latch member. The child seat is provided with a belt winder in which a belt is wound. The belt is withdrawn from the belt winder, the end of the belt is latched to the latch member, and the belt is then tightly wound by the belt winder (JPA 5-254367). In this conventional example, the belt is wound by gripping and turning a disk-like operating knob.

The conventional structure is inconvenient because it is necessary to strongly grip the operating knob for winding the belt.

OBJECT AND SUMMARY OF THE INVENTION

It is an object of the present invention to solve the above conventional problem and to enable a child seat to be securely fixed to a vehicle seat in a simple manner.

A child seat of the present invention has a belt having an end capable of latching to a latch member disposed on a vehicle and a tensioner for tensioning the belt with the end thereof being latched to the latch member so as to fix the child seat. The tensioner comprises: a first clamp portion capable of clamping a part of the belt in the longitudinal direction of the belt, a second clamp portion capable of clamping another part of the belt located at a rear side, belt clamping means disposed to the first clamp portion and the second clamp portion, respectively, for allowing the belt to pass toward the rear end of the belt and preventing the belt from passing toward the front end of the belt, and tension means for pulling the belt between the first clamp portion and the second clamp portion in a direction perpendicular to a direction connecting these clamp portions.

To fix the aforementioned child seat to the vehicle seat, the end of the belt is latched to the latch member of the vehicle seat and after that the rear end of the belt is pulled. At this point, the belt passes through the respective belt clamping means and the clamp portions in a direction toward the rear side of the belt. The belt clamping means prevent the belt from moving toward the front of the belt. Accordingly, the belt becomes in a tightened state to somewhat. A handle attached to the rear end of the belt facilitate the operation of pulling the belt.

The belt between the clamp portions is pulled in a direction perpendicular to the direction connecting the clamp portions by operating the tension means. At this point, the belt clamping means and the second clamp portion prevent the belt from passing toward the front end of the belt so that only a portion of the belt at the front side of the first clamp portion passes through the first clamp portion. Therefore, the child seat is strongly pressed against the vehicle seat. Repeating the pulling operation for several times applies enough tension on the belt, thereby securely fixing the child seat to the vehicle seat.

In the present invention, it is preferable that the first clamp portion and the second clamp portion are connected to each other by the base member, the tension means is provided with a lever pivotally connected to the base member at the proximal end thereof and freely movable in a direction close to and apart from the base member at the distal end thereof, the belt is hung on the lever and the belt is pulled by pivoting the lever in a direction apart form the base member.

In this case, pivoting the lever quite easily applies tension on the belt.

The tension means such as the lever is preferably disposed on a side of the child seat, thereby facilitating the tensioning operation. In addition, the tension means is preferably disposed in such a manner that the direction of pivoting the lever is a direction apart from the child seat, thereby easily applying a large force on the lever.

DESCRIPTION OF THE PREFERRED EMBODIMENT

Hereinafter, an embodiment will be described with reference to drawings.

Figure 1:
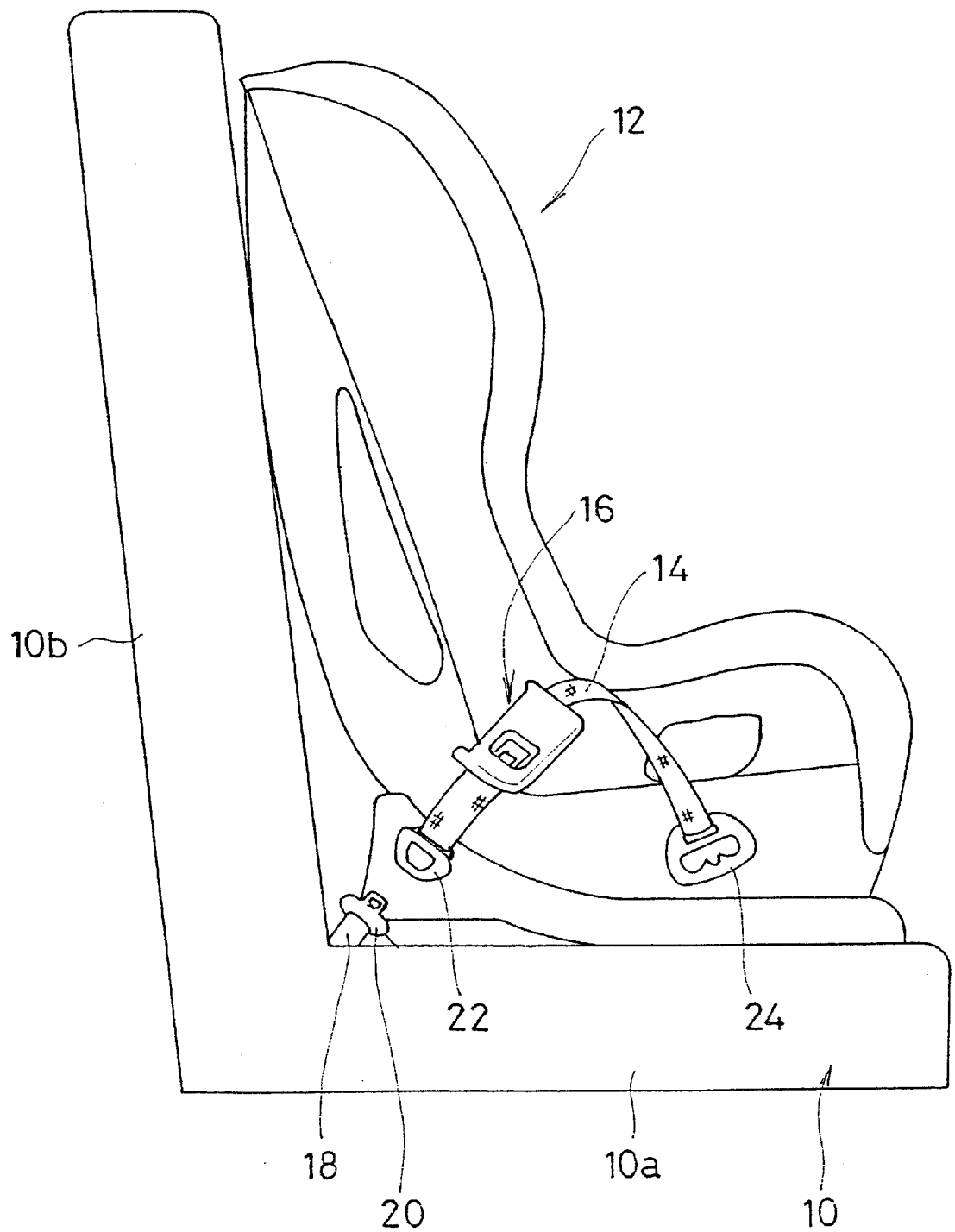
FIG. 1 is a side view showing a state of fixing a child seat according to an embodiment to a vehicle seat.
Figure 2:
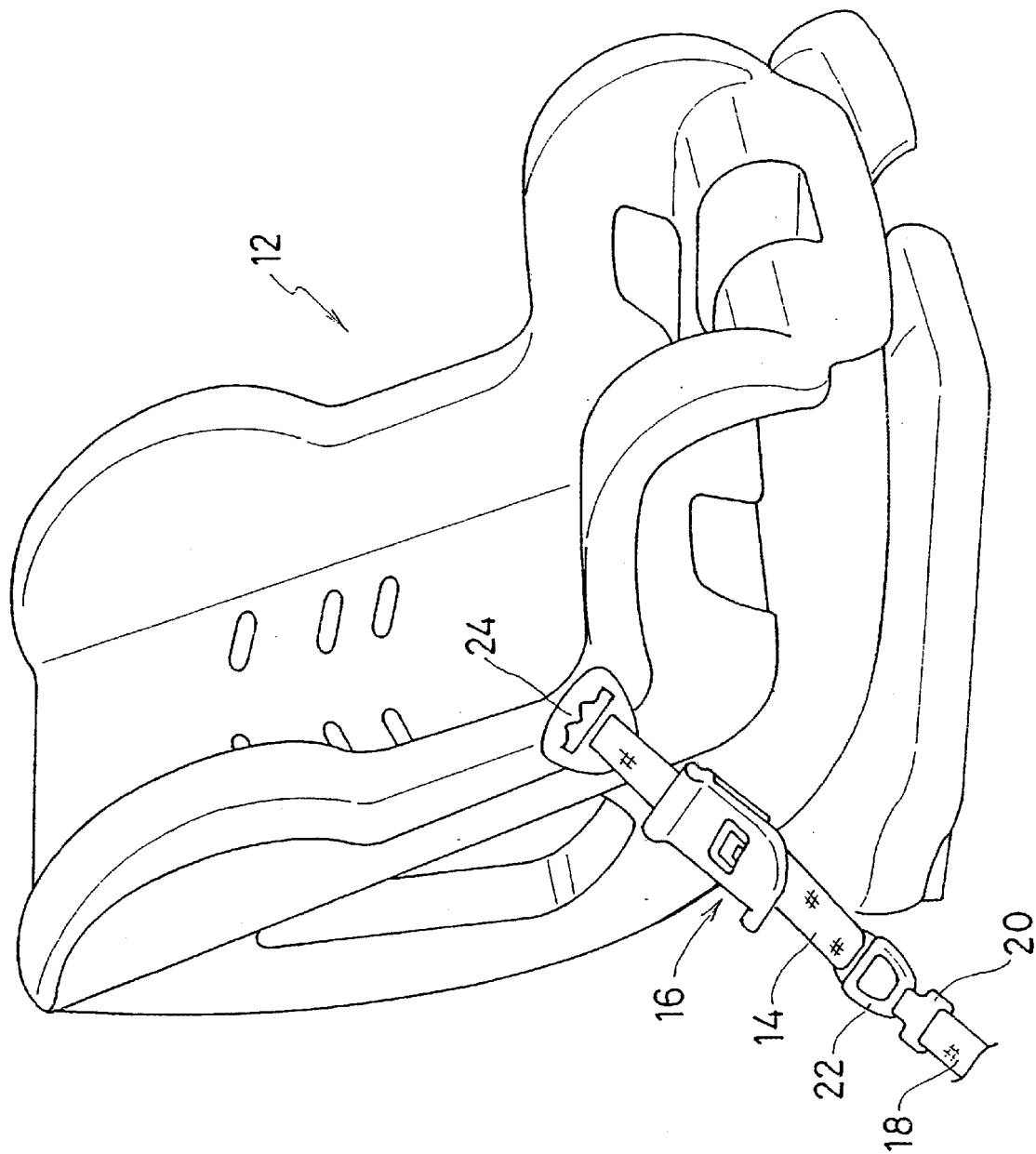
FIG. 2 is a perspective view of the child seat according to the embodiment.

As shown in FIGS. 1 and 2, a child seat 12 is put on a vehicle seat 10 and is fixed to the vehicle seat 10 by a belt 14 and a tensioner 16. The vehicle seat 10 is provided with a seat-side belt 18 adjacent to a corner between a seat cushion 10a and a seat back 10b of the vehicle seat 10. The seat-side belt 18 has a tongue 20 as a latch member at the end thereof. The belt 14 is provided with a buckle 22, into which the tongue 20 is latched, at an end thereof and with a handle 24 for pulling the belt at the other end thereof.

Figure 3:
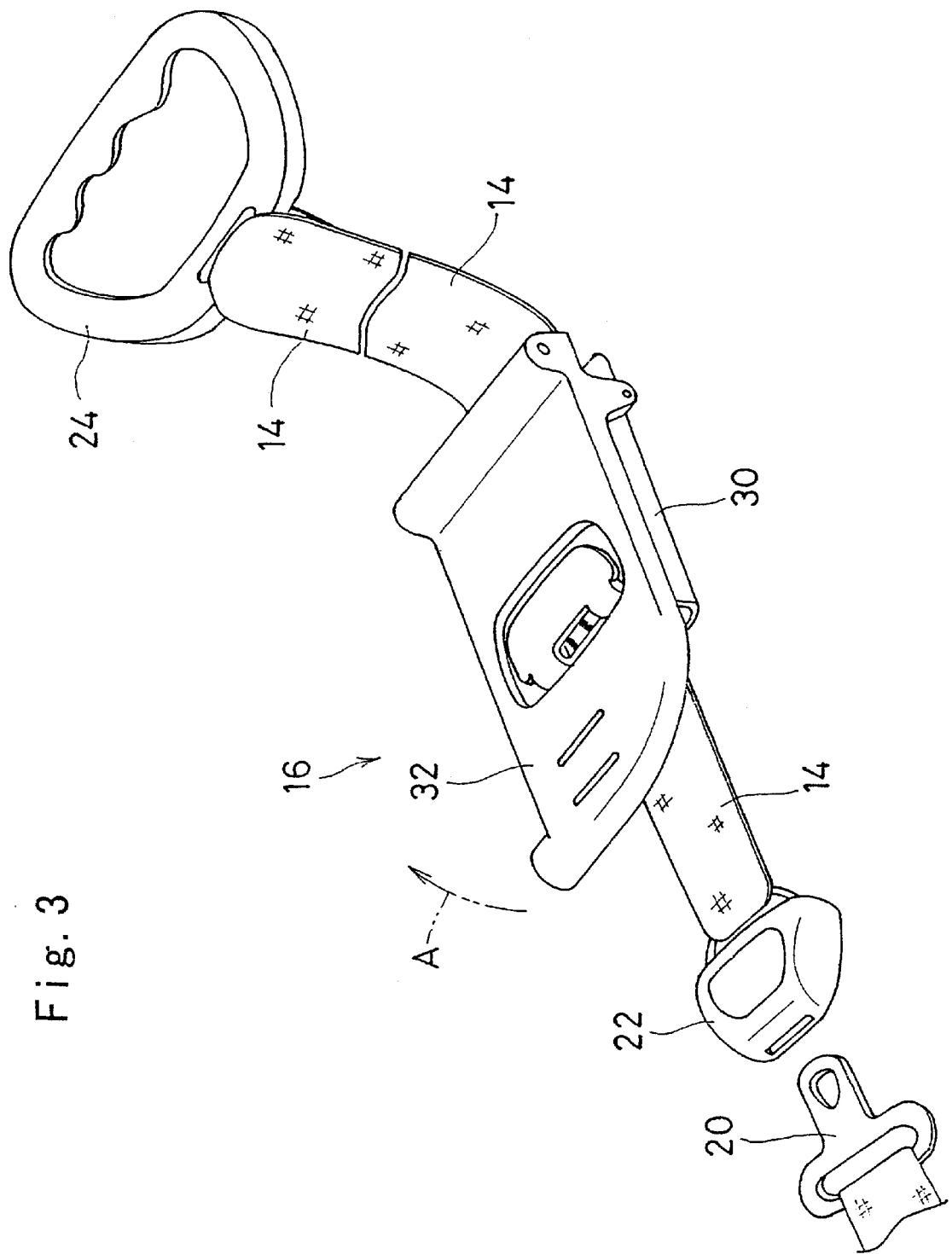
FIG. 3 is a perspective view of a tensioner.

As shown in FIG. 3, the tensioner 16 comprises a base 30 and a lever 32, one end of which is pivotally secured to the base 30. Pivoting the lever 32 upward in a direction as indicated by the arrow A of FIG. 3 tensions the belt 14.

Hereinafter, the structure of the tensioner 16 will be described in detail with reference to FIGS. 4, 5, and 6.

Figure 4:
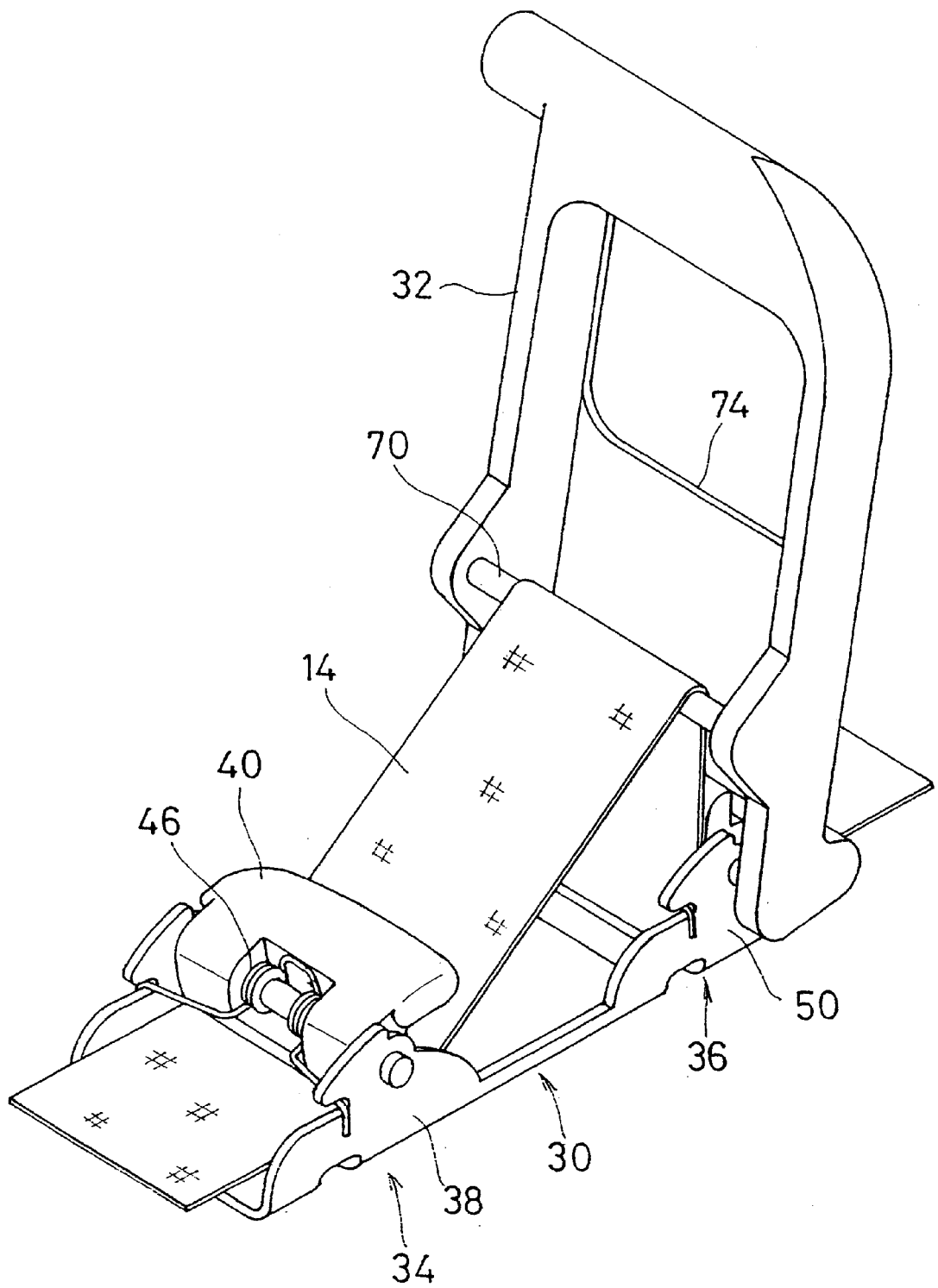
FIG. 4 is a perspective view of the tensioner.
Figure 5:
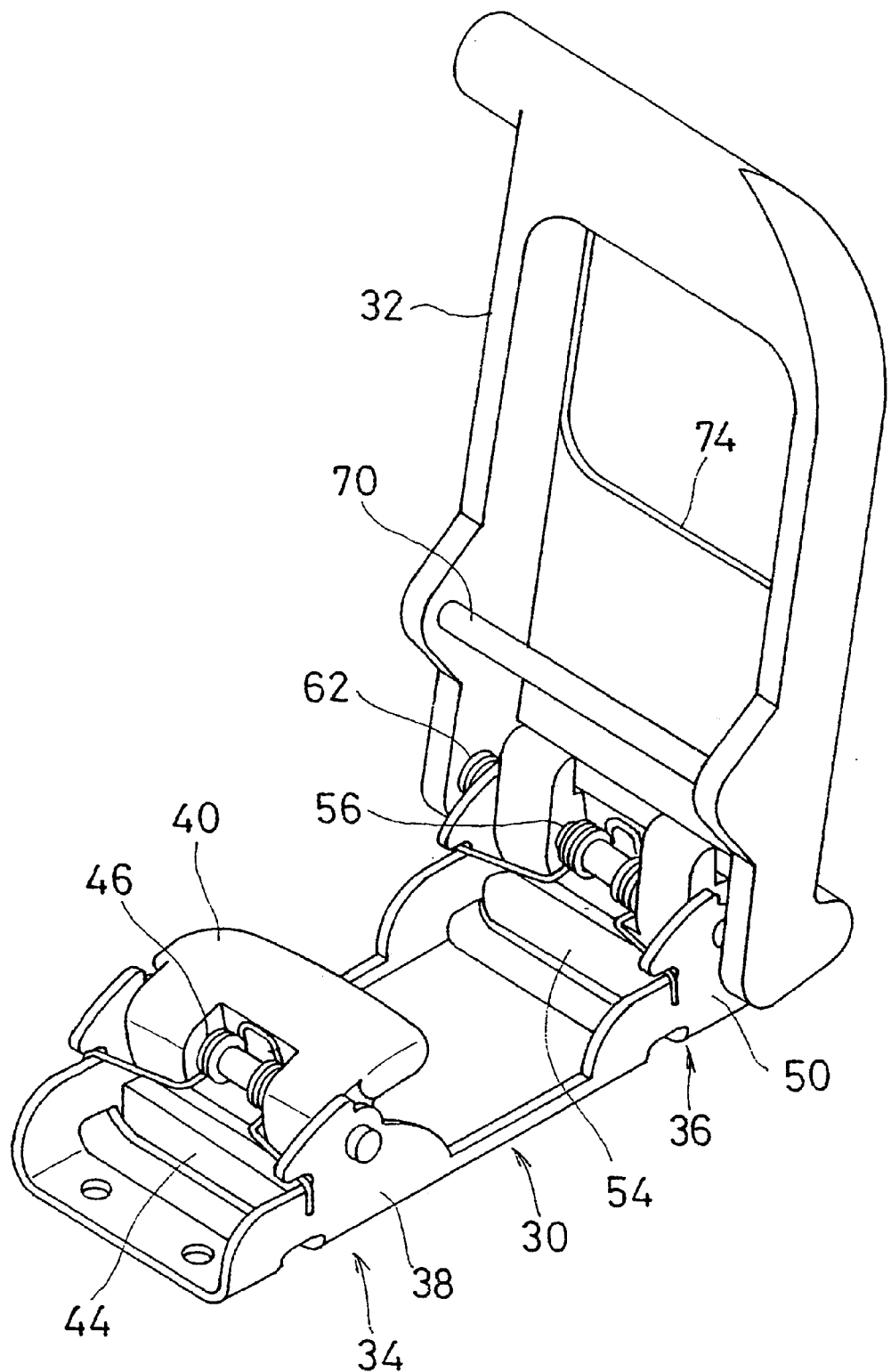
FIG. 5 is a perspective view of the tensioner without a belt.

As shown in FIGS. 4 and 5, the base 30 is provided with a first clamp portion 34 at the buckle 22 side and a second clamp portion 36 at the handle 24 side. The first clamp portion 34 comprises a pair of first standing pieces 38 standing up from the base 30, a first cam 40 disposed between the first standing pieces 38 and 38, a first cam pin 42 supporting the first cam 40 to the first standing pieces 38, a first toothed member 44 fixed to the base 30 to confront teeth 40g of the first cam 40, and a first cam spring 46 for biasing the first cam 40 such that the teeth 40g of the first cam 40 faces the first toothed member 44.

The first cam 40 is provided with a concave portion 40a for accommodating coil portions 46a of the first cam spring 46 and with pin through holes 40b formed penetrate the concave portion 40a. The first cam pin 42 is inserted through the pin through holes 40b and the first cam pin 42 is inserted into the coil portions 46a. The first cam pin 42 is also inserted into holes 38a formed in the first standing pieces 38.

Figure 6:
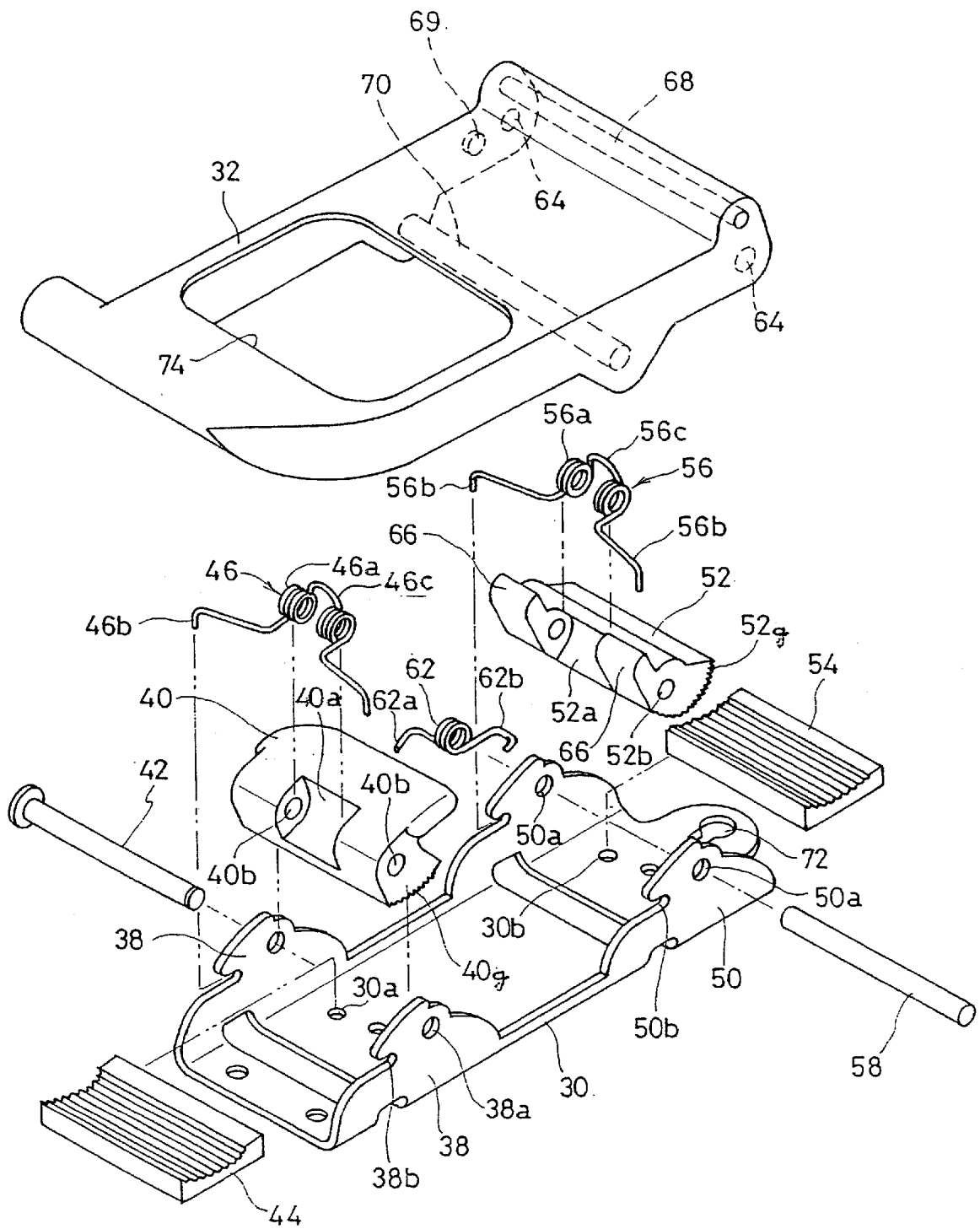
FIG. 6 is an exploded perspective view of the tensioner.

Legs 46b of the first cam spring 46 are engaged with notches 38b formed in the first standing pieces 38 and a tie 46c connecting the coil portions 46a, 46a each other is brought into contact with the inner surface of the concave portion 40a so that the first cam 40 is biased in a clockwise direction in FIGS. 4, 5, 6 by the first cam spring 46.

The second clamp portion 36 comprises a pair of second standing pieces 50 standing up from the base 30, a second cam 52 disposed between the second standing pieces 50 and 50, a second toothed member 54 confronting teeth 52g of the second cam 52, and a second cam spring 56 for biasing the second cam 52 in the clockwise direction in FIGS. 4, 5, and 6, a second cam pin 58 supporting the second cam 52 to the second standing pieces 50.

The second standing pieces 50 are formed with through holes 50a for the second cam pin 58 which is inserted through the through holes 50a, holes 52b of the second cam 52, and coil portions 56a of the second cam spring 56.

The second cam pin 58 is also inserted through a coil portion of a lever spring 62 as described later.

Legs 56b of the second cam spring 56 are engaged with notches 50b formed in the second standing pieces 50. The second cam spring 56 has a tie 56c connecting the coil portions 56a, 56a each other. As the tie 56c comes in contact with the inner surface of the concave portion 52a of the second cam 52, the second cam 52 is biased in the clockwise direction.

The first toothed member 44 and the second toothed member 54 are disposed between the first standing pieces 38, 38 and between the second standing pieces 50, 50, respectively, and are fixed to the base 30 by using mounting holes 30a, 30b formed in the base 30, respectively. These toothed members 44, 54 are provided with teeth for engaging the belt 14.

The lever 32 has cam-pin-fixing portions 64, to which the ends of the second cam pin 58 are fixed, at the rear end thereof. The lever 32 is pivotally connected to the base 30 by the second cam pin 58. The lever 32 is provided with the cam-holding bar 68, which hook portions 66 of the second cam 52 come in contact with, at the rear end thereof. The cam-holding bar 68 extends in a direction parallel with the second cam pin 58.

The lever 32 is also provided with a lever-spring-hanging projection 69 located adjacent to one of the cam-pin-fixing portions 64. One leg 62a of the lever spring 62 is hooked to this projection 69. The other leg 62b of the lever spring 62 is hooked to the second standing piece 50. The lever spring 62 biases the lever 32 in the counter clockwise direction.

The lever 32 is provided with a belt-hanging bar 70, extending in a direction parallel to the cam pin 58, at the middle portion along the longitudinal direction. The belt 14 is inserted between the belt-hanging bar 70 and the lever 32.

The base 30 is formed with bolt holes 72 for fixing the tensioner 16 to the child seat 12.

The method of fixing the child seat 12 with the tensioner 16 as structured above to the vehicle seat 10 will now be described.

As shown in FIG. 1, the child seat 12 is first placed on the vehicle seat 10 and the tongue 20 and the buckle 22 are latched with each other. It should be noted that since a combination of the belt 14 and the tensioner 16 is disposed on each of the both (right and left) sides of the child seat 12, the buckles 22, 22 of the belts 14 on the both sides are engaged with the tongues 20, 20.

Then, the handle 24 is gripped to pull the belt 14 upward with the child seat 12 being pressed onto the vehicle seat 10, thereby tightening the belt 14 somewhat.

The tip end of the lever 32 is grasped and the lever 32 is thus pivoted desired times in the direction as indicated by the arrow A to strongly tighten the belt 14, thereby fixing the child seat 12. The operation of the tensioner 16 when the lever 32 is pivoted will be now described with reference to FIGS. 7, 8, and 9.

Figure 7:
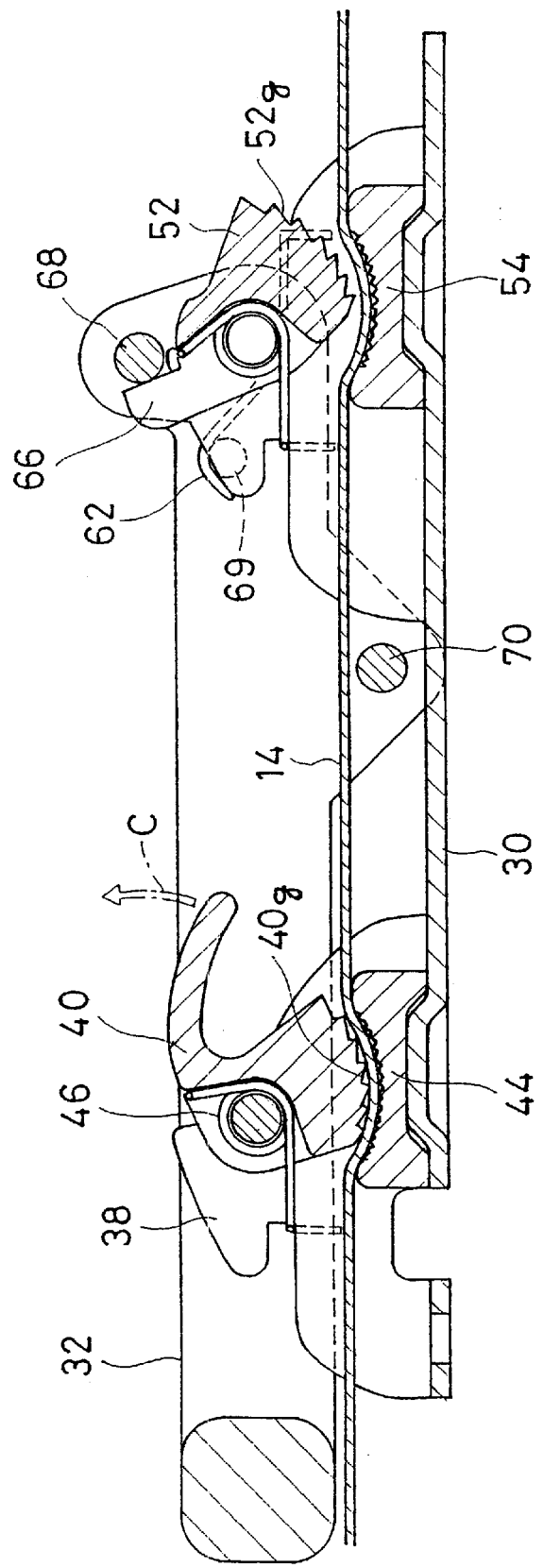
FIG. 7 is a sectional view of the tensioner.

FIG. 7 shows a state before pivoting the lever 32. In this state, the belt 14 is clamped between the teeth 40g of the first cam 40 and the first toothed member 44. The hook portions 66 of the second cam 52 are pressed by the cam-holding bar 68 so that the second cam 52 is biased in the counter clockwise direction and the teeth 52g are spaced apart from the second toothed member 54.

The first cam 40 is biased in the clockwise direction by the first cam spring 46. Since the teeth 40g are formed to be inclined toward the right in FIG. 7, the belt 14 can move in a direction toward the right in FIG. 7 even when the belt 14 is clamped between the teeth 40g and the first toothed member 44. However, as the belt is intended to move in a direction toward the left in FIG. 7, the teeth 40g engage the belt 14 strongly, thereby preventing the belt 14 from moving in the direction toward the left.

Figure 8:
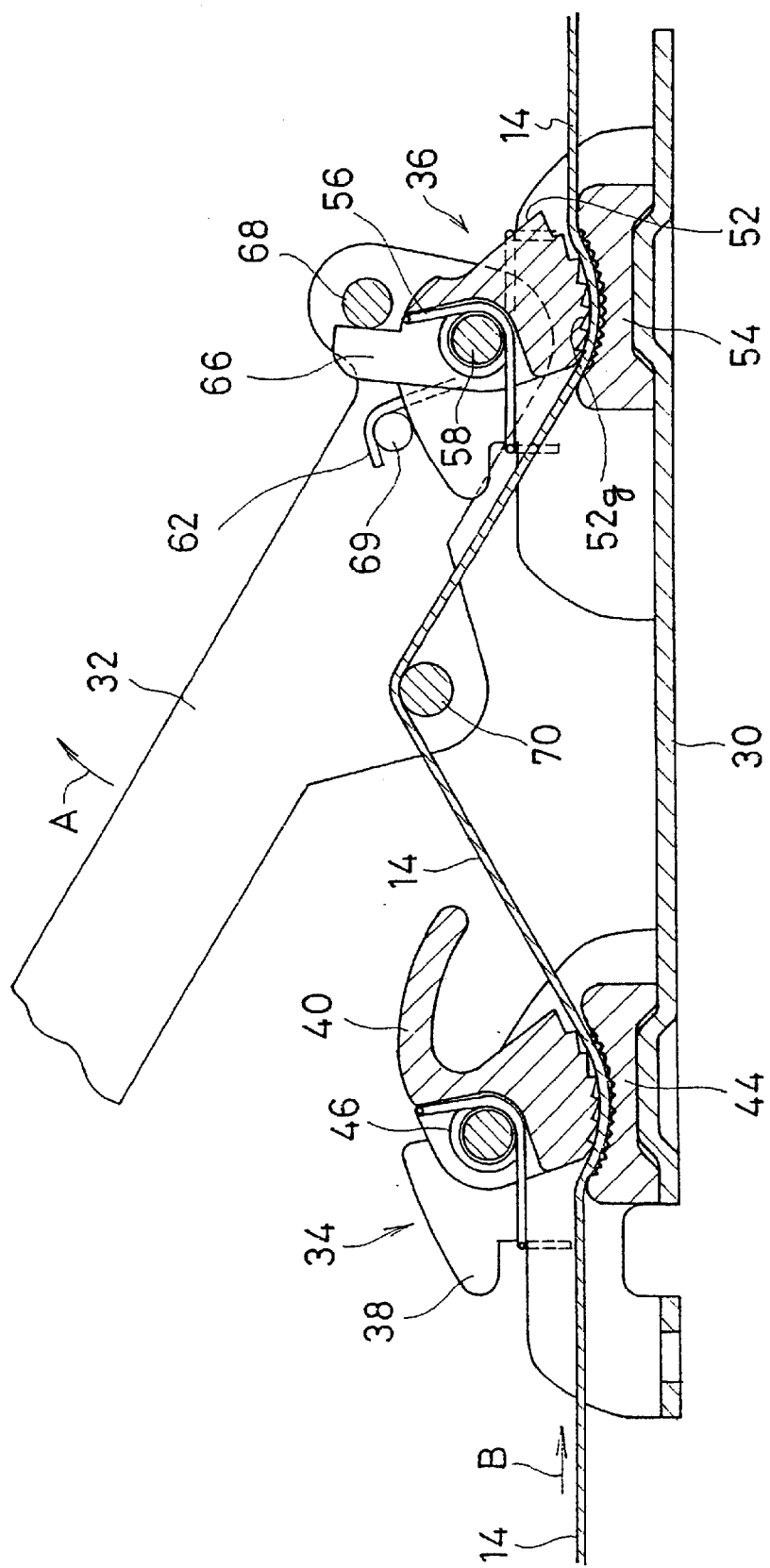
FIG. 8 is a sectional view in a state that a lever is pivoted to increase the tension applied on the belt.

As shown in FIG. 8, as the lever 32 begins to be pivoted, the cam-holding bar 68 is rotated about an axis of the second cam pin 58 in the clockwise direction so that the second cam 52 is also rotated in the clockwise direction by the biasing force of the second cam spring 56. Accordingly, the belt 14 is clamped between the teeth 52g of the second cam 52 and the second toothed member 54. The teeth 52g are also formed to be inclined toward the right in FIG. 8 so that the belt 14 clamped between the teeth 52g and the second toothed member 54 is allowed to move in a direction toward the right and not allowed to move in a direction toward the left.

By pivoting the lever 32 in the direction as indicated by the arrow A, the belt-hanging bar 70 pulls the belt 14 in the upward direction (a direction perpendicular to a direction connecting the clamp portions 34 and 36). As mentioned above, in this state, the belt 14 cannot pass between the second toothed member 54 and the teeth 52g in the direction toward the left. On the other hand, the belt 14 can pass between the first toothed member 44 and the teeth 40g in the direction toward the right. Therefore, as the belt-hanging bar 70 pulls up the belt 14, the belt 14 at the left side of the first clamp portion 34 is pulled in a direction as indicated by the arrow B. The belt 14 between the first clamp member 34 and the buckle 32 is tightened.

Figure 9:
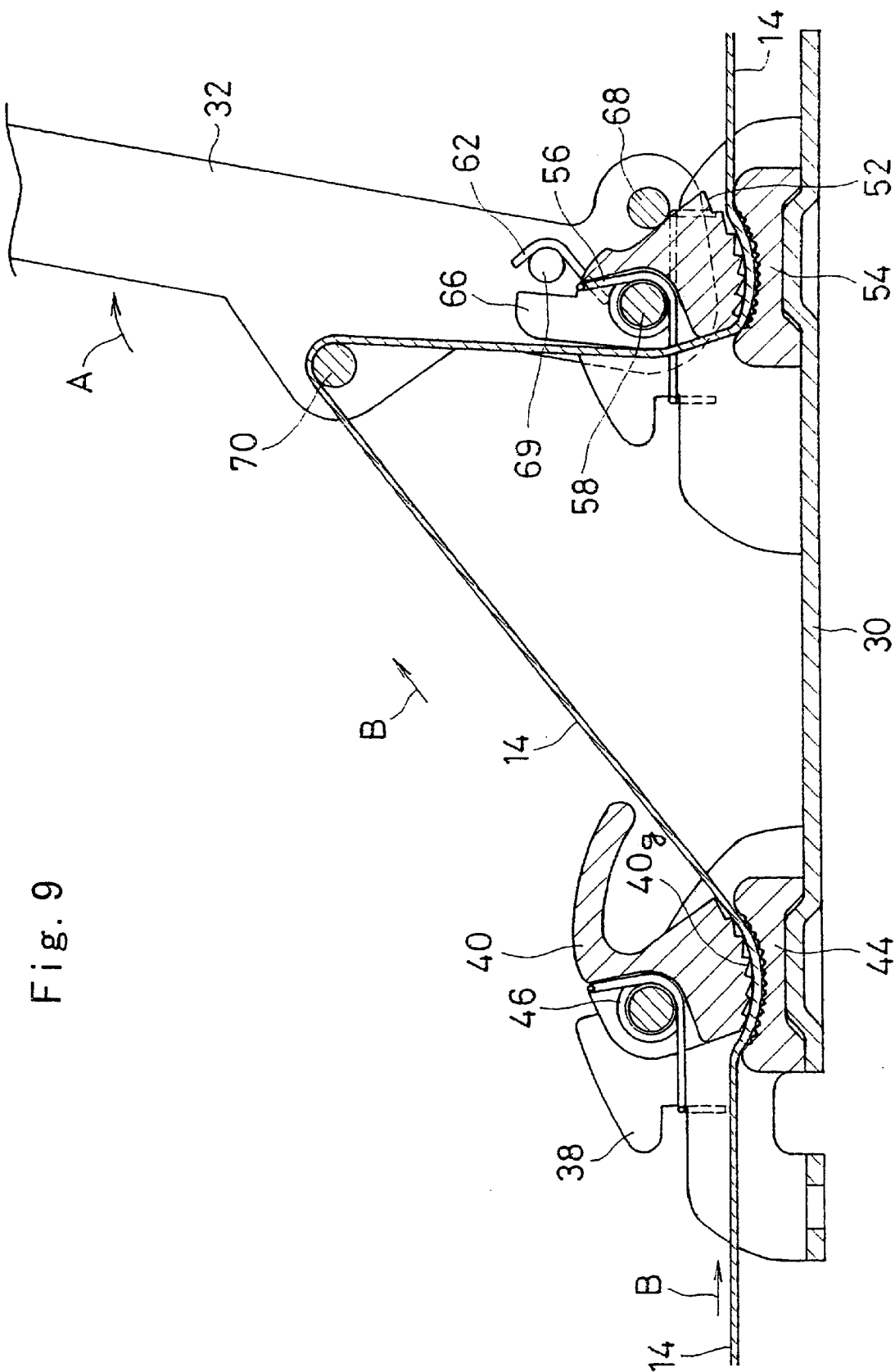
FIG. 9 is a sectional view in a state that the lever is further pivoted to increase the tension applied on the belt.

As shown in FIG. 9, the lever 32 is further pivoted in the direction as indicated by the arrow A so that the belt 14 is further tightened.

As the lever is returned from the state of FIG. 9 to the state of FIG. 7, the belt 14 has a slack between the clamp portions 34, 36. The slack of the belt 14 between the clamp portions 34, 36 is removed by gripping the handle 24 and pulling the belt 14. Then, the lever 32 is pivoted again as shown in FIGS. 8 and 9 to further increase the tension on the belt 14. By repeating the pivoting of the lever 32 and the pulling (slack-removing) of the belt 14, the tension on the belt 14 is sufficiently increased so that the child seat 12 is securely fixed to the vehicle seat 10. Though the above description is made as regard to the case that the pivoting of the lever 32 is repeated several times, only one operation of pivoting the lever 32 may be enough sometimes.

According to the child seat 12 of this embodiment, the tension on the belt 14 is increased by pivoting the lever 32 of the tensioner 16. Therefore, it can easily apply more strong tension on the belt 14 as compared to the conventional example which needs to grip and turn the operating knob.

In this embodiment, the lever 32 is disposed on the side of the child seat 12 so that the whole lever 32 is exposed outside of the child seat 12. Therefore, the lever 32 can be quite easily operated. In addition, since the direction of pivoting of the lever 32 (the direction as indicated by the arrow A) is a direction laterally apart from the child seat 12, hands and arms of an operator do not interfere with parts of the vehicle body when operating the lever 32, thereby facilitating the pivoting of the lever. In order to remove the fixed child seat 12 from the vehicle seat 10, the first cam 40 is pivoted in a direction as indicated by the arrow C in FIG. 7 through an opening 74 formed in the lever 32. Accordingly, the belt 14 can pass between the first toothed member 44 and the first cam 40 in the direction toward the left in FIG. 7 so as to loose the belt 14. After loosing the belt 14, the latching between the tongue 20 and the buckle 22 is released so that the child seat 12 can be removed from the vehicle seat 10.

As described above, according to the present invention, the child seat can be easily fixed to the vehicle seat. In the present invention, since the tension on the belt can be increased by pivoting the lever, the child seat can be enough and securely fixed to the vehicle seat in a simple manner even by a person who has a weak grip.

What is claimed is:

1. A child seat comprising:

a belt having an end capable of latching to a latch member disposed on a vehicle, and a tensioner for tensioning said belt with the end thereof being latched to said latch member so as to fix the child seat, said tensioner comprising:

a first clamp portion capable of clamping a part of said belt extending in a longitudinal direction, a second clamp portion capable of clamping another part of said belt, said second clamp portion being located at a rear side of the belt, belt clamping means disposed adjacent to the first clamp portion and the second clamp portion, respectively, for allowing a front side of the belt to pass toward the rear side of said belt and preventing said rear side of the belt from passing toward the front side of said belt, and tension means for pulling the belt between the first clamp portion and the second clamp portion in a direction perpendicular to a direction connecting these clamp portions.

2. A child seat as claimed in claim 1, wherein said first clamp portion and said second clamp portion are connected to each other through a base member, said tension means is provided with a lever pivotally connected to said base member at a proximal end thereof and freely movable in a direction close to and apart from the base member at a distal end thereof, and said belt is hung on said lever and said belt is pulled by pivoting said lever in a direction apart form the base member.

3. A child seat as claimed in claim 2, wherein said base member is disposed outside of a side of said child seat, and said base member is mounted to said child seat in such a manner that a direction of pivoting said lever for pulling the belt is a direction apart from the side of said child seat.

4. A child seat as claimed in claim 1, wherein said tensioner is disposed outside of a side of said child seat.

5. A child seat as claimed in claim 1, wherein said belt has a handle for pulling the belt by hand, at the rear end thereof.

* * * * *